March 22, 1938. J. HANDLEY 2,111,927
TICKET PRINTING AND ISSUING MACHINE FOR TOTALIZATORS
Filed Aug. 29, 1936 10 Sheets-Sheet 3

Fig. 1b

Inventor
John Handley
By
Prunis, Davis, Marvin & Edmonds
Attorneys

March 22, 1938.  J. HANDLEY  2,111,927

TICKET PRINTING AND ISSUING MACHINE FOR TOTALIZATORS

Filed Aug. 29, 1936  10 Sheets-Sheet 8

FIG. 5.

Inventor
John Handley
By
Attorneys

Fig. 7.

Patented Mar. 22, 1938

2,111,927

UNITED STATES PATENT OFFICE 2,111,927

TICKET PRINTING AND ISSUING MACHINE FOR TOTALIZATORS

John Handley, London, England

Application August 29, 1936, Serial No. 98,524
In Great Britain January 9, 1935

2 Claims. (Cl. 101—66)

The invention relates to improvements in ticket printing and issuing machines for totalizators and consists of an improved construction in which a contestant type is selected by rotating a dial or dials, and in which printing, issuing, and guillotining of the tickets are effected by a forward and a return movement of an operating lever.

The invention is illustrated in the accompanying drawings in which Fig. 1d is an inverted plan view of the machine.

Referring to the drawings, a manually operable printing lever 1 pivoted on a main shaft 2 is engageable alternately with each of two stops 3, 3a mounted on a swinging rack 4. In the operation of the lever 1 to print and issue a ticket, a pawl 5 engages the teeth 9 of the rack 4 in the forward stroke of the lever 1, so that the rack cannot be moved back until it has completed its forward stroke and until the pawl 5 has been rocked by a projection 6 on the rack and a spring-loaded plunger 7 is engaging on the other side from that shown of an abutment 8 movable with the pawl 5. The lever 1 and the rack 4 are then free to return, a projection 10 on the rack restoring the pawl 5 and the abutment 8 to the position shown in Figs. 1 and 1a when the rack 4 has completed its return stroke. The lever 1 and associated parts are returned by a spring 200 (Fig. 1d) acting through an arm 201 on the main shaft 2 at the remote side of the machine as viewed in Fig. 1.

The rack 4 is secured on the main shaft 2 together with a bracket 11 which is engageable at 13, in each forward stroke of the lever 1, with one of two paper feed arms 12 disposed one on each side of a feeding strip p of ticket-forming paper and adapted to perform conjoint swinging movement about the axis of the main shaft 2 under the action of the bracket 11. A spring-loaded plunger 14 is provided to allow the bracket 11 to continue its return travel to actuate a guillotine trip device after the feed arms 12 and therewith the paper strip p have come to rest.

The paper strip p travels up a guide 15 when gripped between rollers 16 and 17 carried by each feed arm 12. The roller 16 is eccentrically journalled, has a roughened surface, is urged in gripping direction by a spring 18, and may be rotated in releasing direction by manipulation of a pin 19 whereby to free the paper strip p. The rollers 16, 17 thus constitute a strip-feeding device with a self-tightening grip. Retaining rollers 20 and 21 are provided at the lower end of the guide 15 to prevent the paper strip p slipping backwards, and a spring 18' and a release pin 19' are provided for these rollers also. When the feed arms 12 swing downwardly to the bottom of the guide 15, the rollers 16 and 17 slide over the paper strip p which is held by the rollers 20 and 21 and, when the arms 12 swing upwardly the paper strip p is pushed upwardly through the machine to be cut off by a guillotine blade 22. The strip-feeding device above described forms the subject of U. S. Patent No. 2,068,914.

The guillotine blade 22 is actuated from the lever 1 by an arm 25 secured on the shaft 2, and a link 24 connecting the arm 25 with the lower end of a lever 23 of which the upper end 23' penetrates a slot 202 in the blade 22 which is opened during the forward or printing stroke of the lever 1 when the feed arms 12 are moved downwardly. When the blade 22 is fully open a spring 26 is stretched by the lever 23 and the lever 23 is retained by a detent 27 presenting a face 27' which engages a stop 28 on the lever 23. The link 24 travels forwardly on the return movement of the lever 1 as the paper strip is fed and a slot 29 in the link 24 passes over a pin 30 in the lever 23 until the forward end of the link 24 engages an adjustable eccentric roller 31 on the detent 27 which releases the lever 23 whereupon the spring 26 actuates the blade 22 to cut off the printed ticket.

Printing is effected through a carbon ribbon carried on spools 32 and adapted to be squeezed between type and a platen 33 by a cam 34 engageable with a roller 35 mounted in the platen. The cam 34 is rotated through 90° on each forward stroke of the printing lever 1 by a link 36, pawl-lever 37', pawl 37, and ratchet wheel 38. The cam 34 has four recesses 39 and four cam faces 40. The recesses 39 provide ample clearance between the platen 33 and the type for paper and ribbon feed whilst the cam faces 40 give intense pressure when the clearance has been taken up. The roller spindle 41 is eccentric and adjustable to vary the printing pressure. The roller 35 and the cam 34 run in anti-friction bearings.

Figure 1:
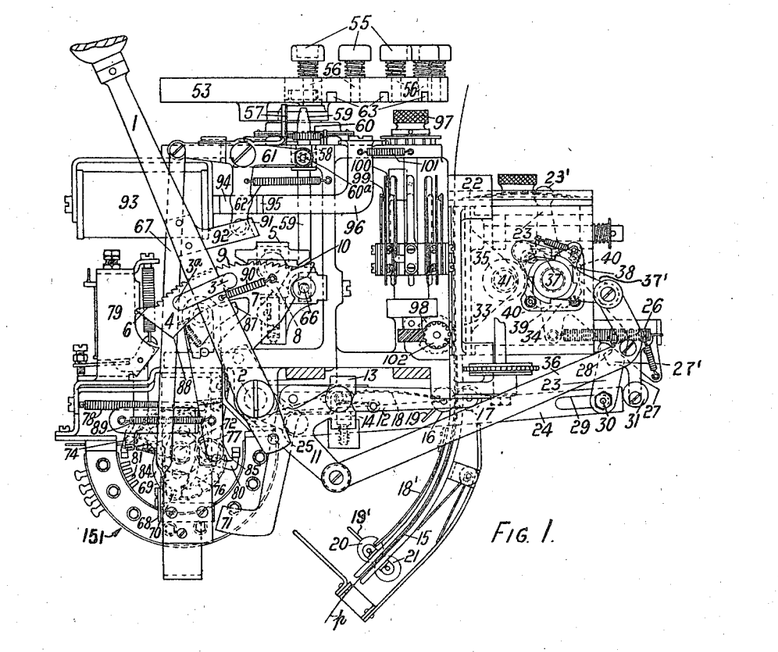
Fig. 1 is a side elevation of a machine with its casing and supporting frame removed.
Figure 1A:
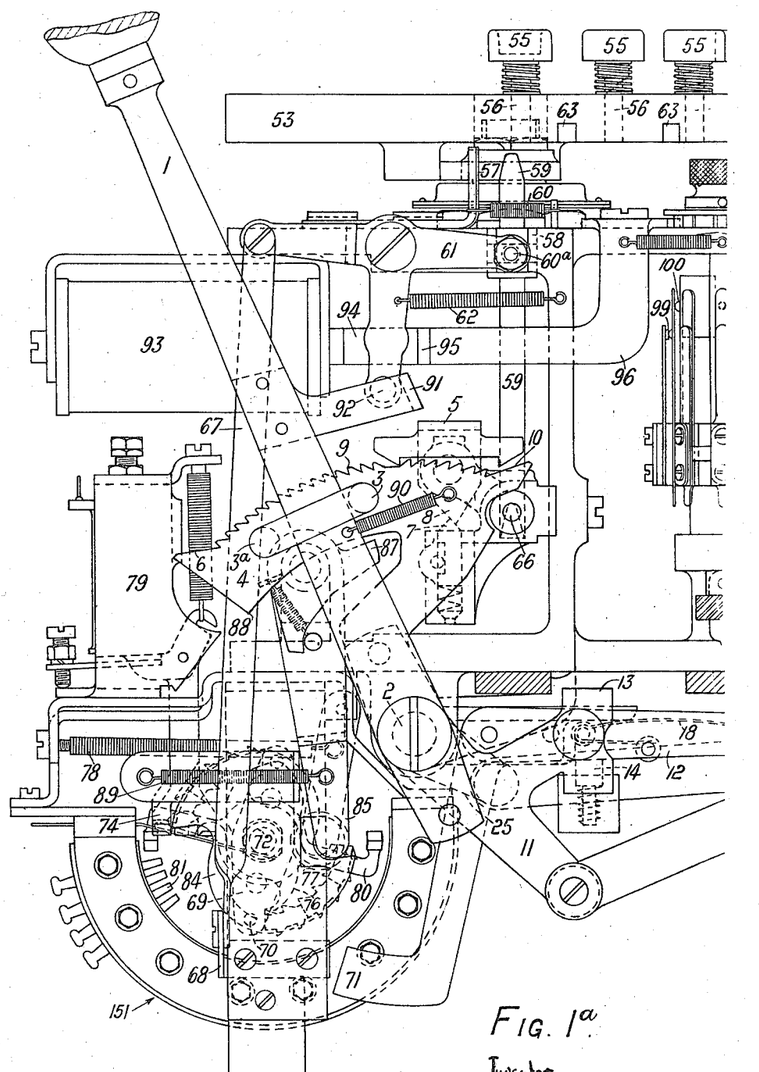
Figs. 1a and 1b together constitute a side elevation drawn to a larger scale than Fig. 1.
Figure 2:
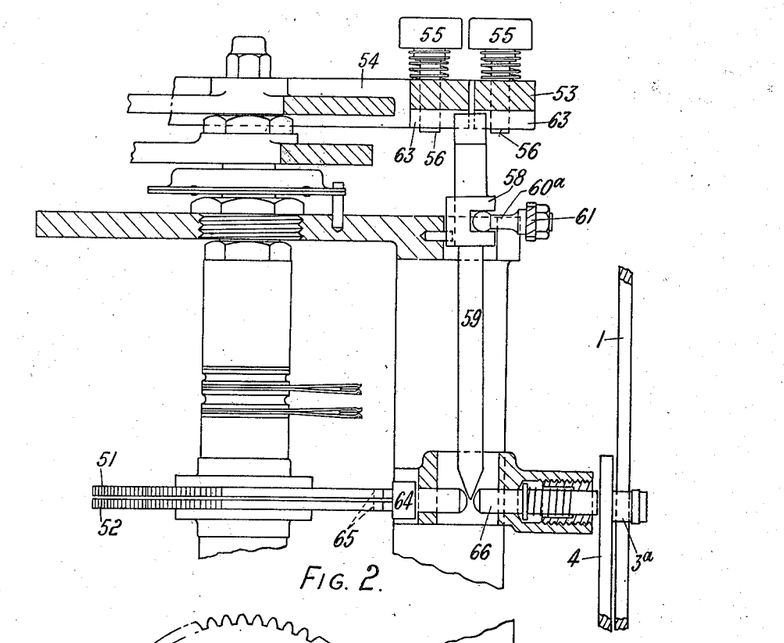
Figs. 2 and 3 are a section and a plan, respectively, showing the locking mechanism of the machine.
Figure 3:
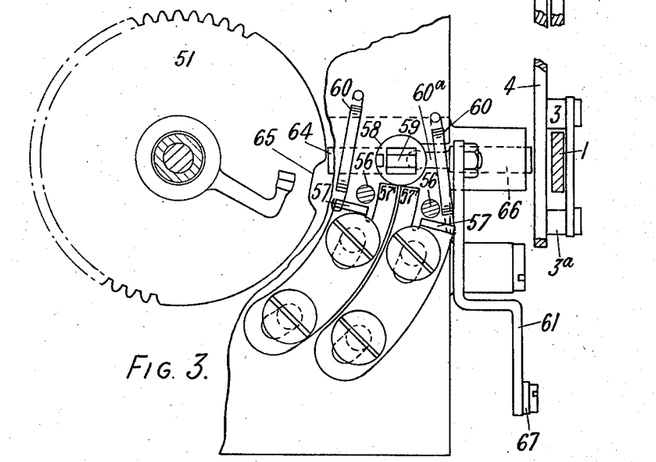

The ribbon, stretched between two rotary spools 32, is fed in either direction by one or other of two pawls 42 each engageable with a ratchet wheel 43. The pawls are mounted on a reciprocatory carrier 44 actuated by a bellcrank 45 which is connected by a link 45' to the link 24. Two type wheels 49 and 50 are rotated to the required printing positions by gear sectors 51 and 52 actuated by dials 53 and 54 provided with plunger keys 55 which are numbered to correspond with units or tens or with winners or seconds. These plunger keys 55 are selected as required, depressed by the fingers of the operative and the dials 53, 54 rotated by them in a clockwise direction until stopped by the engagement of the depressed key spindles 56 with trip plates 57 presenting tongues 57' which normally obstruct, as shown in Figs. 1 and 1a, the boss 58 of a vertical plunger 59. When engaged by the key spindles 56 the trip plates 57 are retracted against the action of springs 60, as shown in Fig. 3, whereby the tongues 57' release the plunger 59 which is lifted by a pin 60ª, on a control lever 61 urged by a spring 62, and locks both of the dials 53, 54 by engaging slots 63 in said dials as shown in Fig. 2. An inner plunger 64, which when the dials are in their zero or test ticket position engages in a recess 65 in the gear sectors 51, 52, is thrown outwards when the dials are rotated (Figs. 2 and 3) and displaces an outer plunger 66 outwardly, the lower end of the plunger 59 being withdrawn from between the plungers 64 and 66 when the plunger 59 ascends. The lower end of the plunger 59 is wedge-shaped and, when withdrawn from between the plungers 64 and 66, permits the plunger 66 to move inwardly by spring effort out of the path of the rack 4, thus permitting operation of the printing lever 1.

When the printing lever 1 is operated it entrains the rack 4 with it and, until the rack is restored to normal position, it is impossible to release the dials 53, 54 by reason of the fact that the rack obstructs outward displacement of the plunger 66 so that the plunger 59 cannot be depressed until the plunger 66 is freed by restoration of the rack to normal position, it being understood that depression of the plunger 59 is prevented so long as the plunger 66 is held against outward displacement, such outward displacement of the plunger 66 permitting passage between the plungers 64, 66 of the wedge-shaped lower end of the plunger 59.

Figure 7:
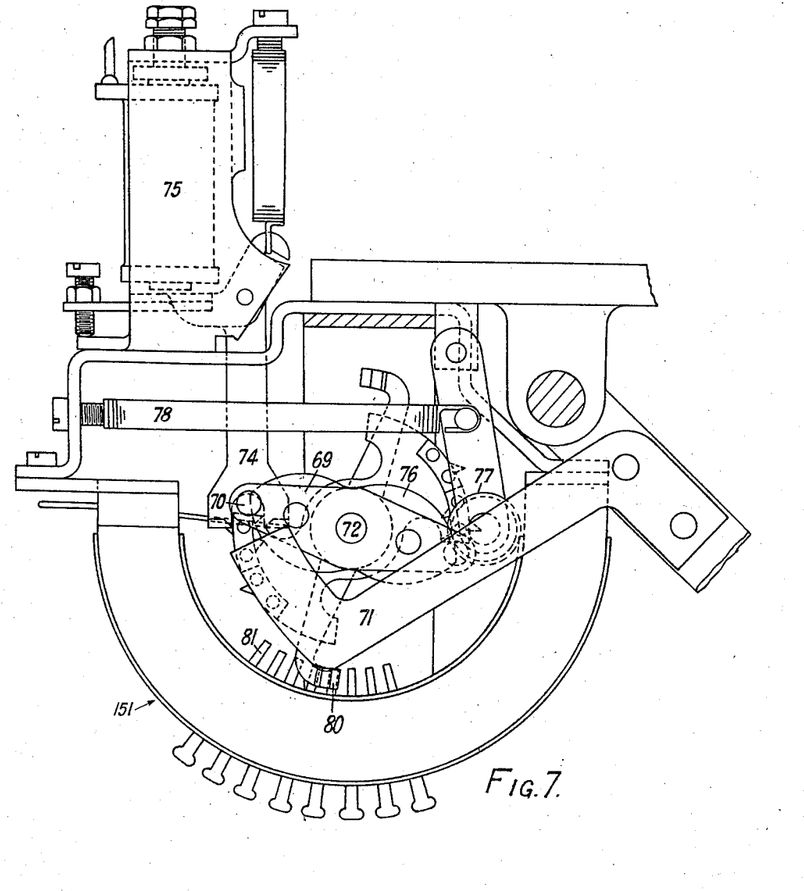
Fig. 7 is a view of the contactor unit of the machine drawn to a larger scale.

For the purpose of transmitting counting impulses to registers (not shown) there is provided a contactor unit 151 (Figs. 1, 1a and 7) which is actuated from the control lever 61 through a link 67 and a cranked lever 68. When the plunger 59 rises to lock the dials 53, 54 the lever 68 slides a plate 69, rotatable with the contactor rotor spindle 72, into an operative position so that a pin 70 on the plate 69 is engageable by a lever 71 operable by the printing lever 1. When now, the printing lever 1 is actuated to print a ticket the contactor rotor spindle 72 is rotated by the lever 71 until a tooth on an escapement device is checked by the armature 74 of a magnet 75.

While the spindle 72 is being rotated, a cam 76 lifts a roller 77 and stretches a spring 78 until the roller 77 has passed over the peak of the cam when the spring 78 causes the spindle 72 to continue a cycle of 180° rotation under the control of the magnet 75 of which the armature 74 releases the escapement in steps as contactor-releasing impulses are produced by a rotary assigning switch located at a control station, it being understood that a ticket printing and issuing machine has access to the registers only for a predetermined interval of time, during which other ticket printing and issuing machines are precluded from access to the registers. As these impulses are received brushes 80 engaging contacts 81 send a counting impulse to the registers by way of brushes 82 and contacts 83 associated with the dial shafts.

Figure 6:
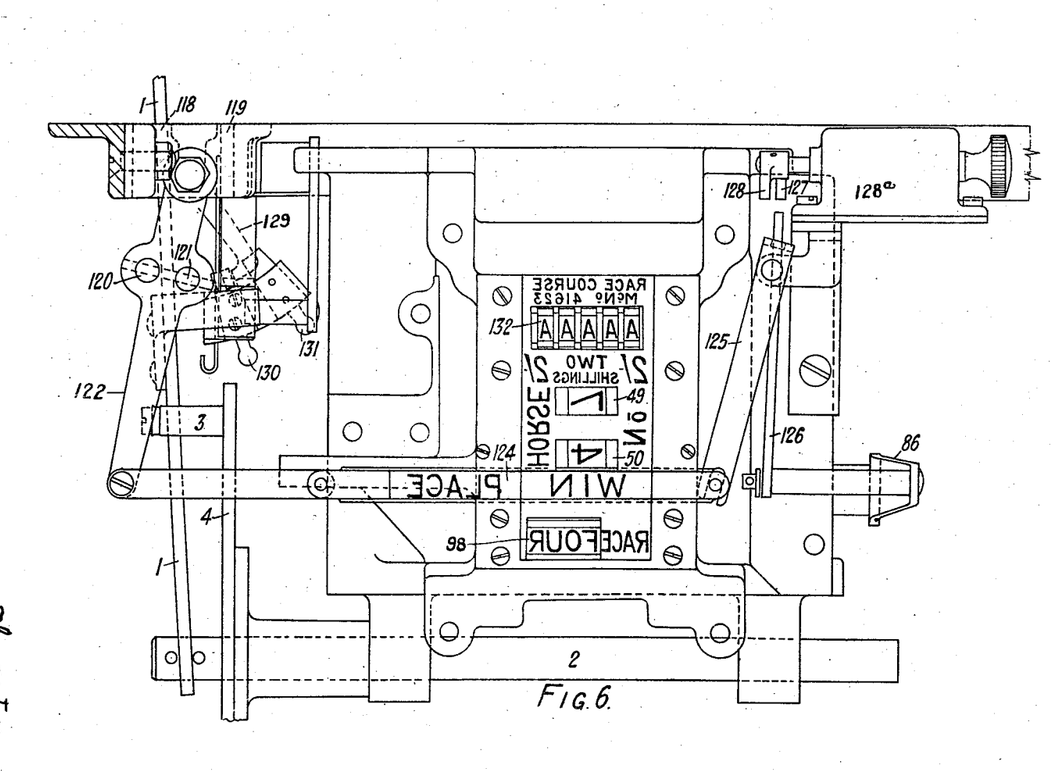
Fig. 6 is an end elevation of the machine with the type exposed to show the type change-over mechanism, and also showing the ticket counter change-over mechanism and negative contacts from win or place registers.

Another cam 84 on the spindle 72 of the contactor unit cooperates with an arm 85 whereby to actuate a ticket counter 127a or 128a through the medium of an arm 86 and a push rod 126 (Fig. 6).

The arm 85 at the same time allows a pawl 87 to lift so that it arrests the rack 4 at point 88 making it impossible for the printing lever 1 to return until the contactor unit has completed its cycle, allowing the arm 85 to return urged by a spring 89.

As the printing lever 1 returns and a ticket is issued the rack 4 is retained by the pawl 5 and the lever 1 continues to move, stretching a spring 90, until stopped by the stop 3a. During this continued movement of the lever 1 a catch 91 on the lever 1 strikes a pin 92 on the control lever 61 and this action withdraws the plunger 59 and allows the trip plates 57 to return and to retain the plunger 59, allowing the dials 53, 54 to return to zero under spring action. When a test ticket is required the printing lever 1 is operated with the dials at zero so that the inner plunger 64 is resting in the recess 65 in the gear sectors 51 and 52 and the plunger 59 is not lifted and, therefore, the contactor unit is not affected to actuate either the ticket counter or the registers.

If a race number control knob 97 is not in its prescribed setting, or if a non-contestant is dialled, a locking solenoid 93 is energized to actuate a plunger 94 which engages the control lever 61 by a boss 95, preventing the plunger 59 from rising so that the machine cannot be set up.

A locking bar 96 is also withdrawn from teeth of the race number control knob 97 so that a type roller 98 may be rotated through spiral gears 102 by turning the knob 97.

Figure 1B:
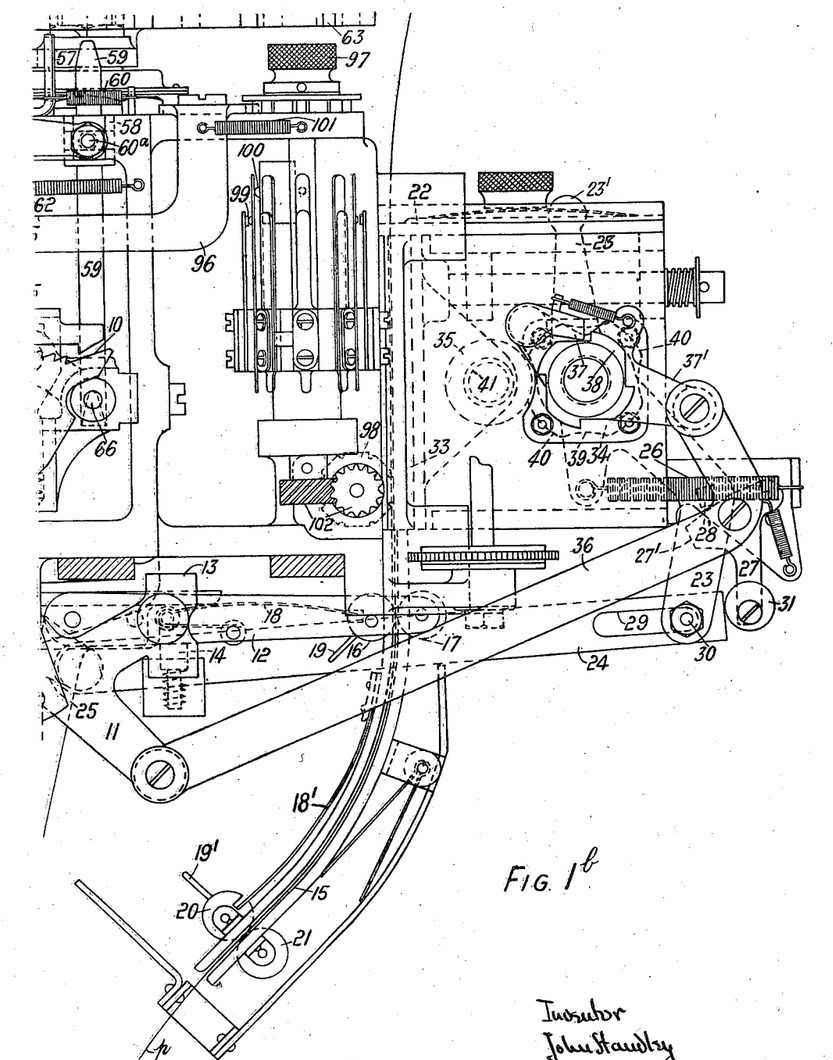
Figure 1C:
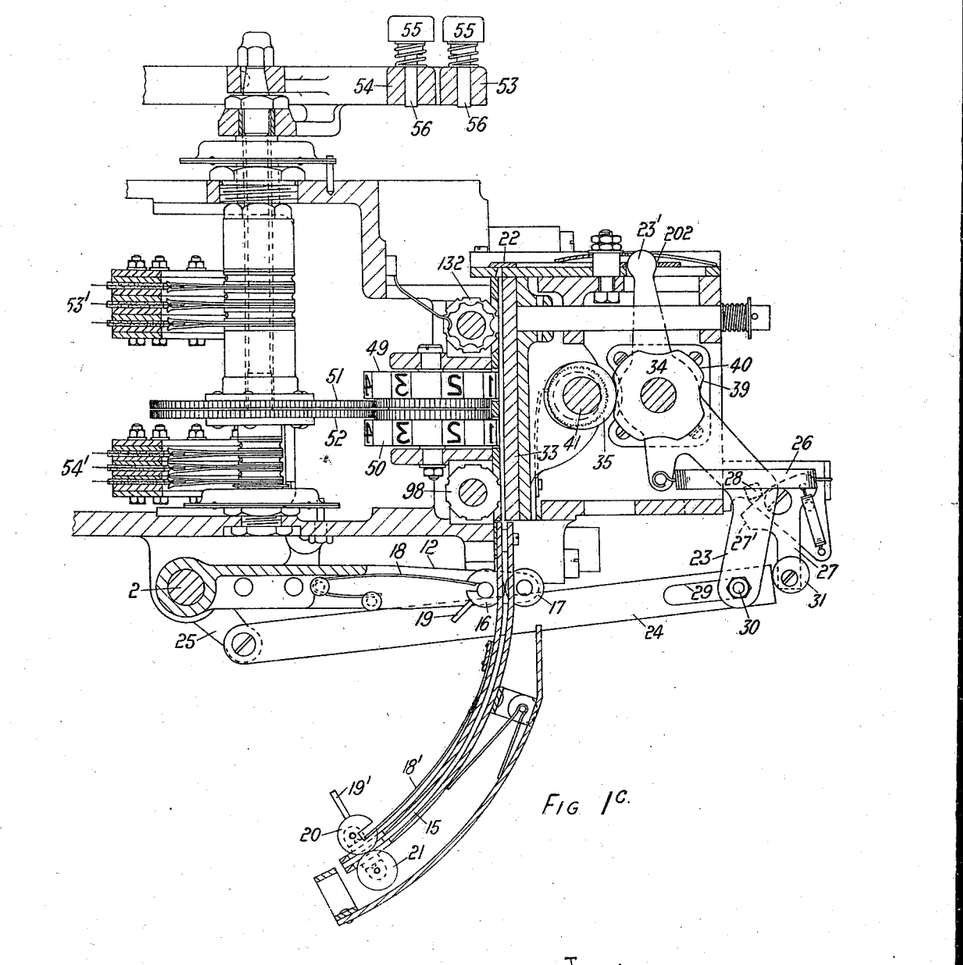
Fig. 1c is a longitudinal section on a plane parallel to the plane of Fig. 1.

Contacts 99 (Figs. 1 and 1b) are closed in turn by an insulated peg 100 which rotates with the knob 97, and a circuit from the control station via any of these contacts is taken to a relay so that the circuit to the solenoid 93 may be broken only when the correct pair of contacts 99 are made, when the solenoid plunger will return urged by a spring 101, and the locking bar 96 will re-engage the race number control knob 97.

For win and place betting, in addition to positioning the contestant number type, win type or place type are brought into printing position alternately and mechanism is provided to cause the win ticket counter 127a or the place ticket counter 128a to operate when corresponding tickets are printed.

Figure 4:
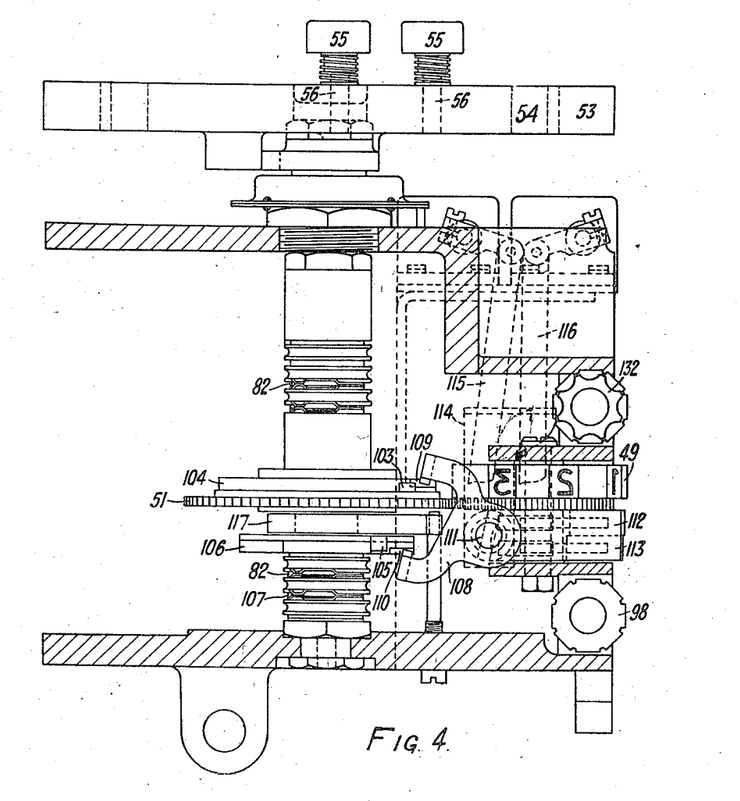
Fig. 4 is a fragmentary section of a modification including win-place type and ticket counter change-over mechanism.

Figure 4 shows a section of a modification including a win-place ticket mechanism suitable for not more than nine contestants. Only one type wheel 49 is used, actuated by a gear section 51 which is rotated selectively from one or the other of the two dials 53, 54, the dial not selected for use being in the zero position. The outer dial 53 operates cam disc 104 and dial 54 operates cam disc 106. Gear section 51 carries pin 103 on one side and pin 105 on the other side. Cam disc 104 has a recess whose edges are engageable with pin 103, and cam disc 106 has a recess whose edges are engageable with pin 105. When selecting to issue a win ticket, outer dial 53 operates cam disc 104 which engages pin 103, thus actuating gear section 51. When selecting to issue a place ticket, dial 54 operates cam disc 106 which engages pin 105, thus actuating gear section 51. Dials 53 and 54 are connected to cam discs 104 and 106 by pipe and shaft means, the pipe actuating the upper cam disc 104, and the shaft actuating the lower cam disc 106.

Upper brushes 82 engage contacts that are wired to win registers and lower brushes 82 engage contacts that are wired to place registers. Brushes 107 are fed from separate wires for non-contestants and these actuate another relay to energize the locking solenoid 93 when a non-contestant is dialled. A spring 117 returns either of the dials to zero.

A fork 108 is actuated by either of the cam discs. When the win cam disc 104 is rotated and the fork lifted by a bevelled cam edge 109, the other end of the fork prevents the place cam disc 106 from rotating by rising in front of a bevelled cam edge 110. In the same way, when the place dial is operated the fork is dropped, preventing the win dial from moving.

The fork spindle 111 is cut away to form a double cam which thrusts forward a win type block 112 when lifted, and a place type block 113, when dropped.

A bracket 114 carried on the spindle 111 forms a guide for ticket counter push rods 115 and 116. 115 is the win counter push rod and 116 is the place counter push rod and these are actuated, when a win or place ticket is printed, by an arm 86 (see Fig. 6) when the contactor unit is actuated by the lever 71 (see Fig. 1).

The win-place type movement and counter change over are actuated by the printing lever 1 when it is moved laterally to operate in one or other of guide slots 118, 119, the lateral setting of the lever 1 determining whether the counter 127a is operated to register a win ticket, or whether the counter 128a is operated to register a place ticket.

The printing handle 1 also moves between rods 120 and 121 in a lever 122 linked to a type bar 124 which also controls a guide 125 to position the push rod 126 to strike a ticket counter arm 127 for a win ticket, or an arm 128 for a place ticket, when operated by the arm 86.

Figure 5:
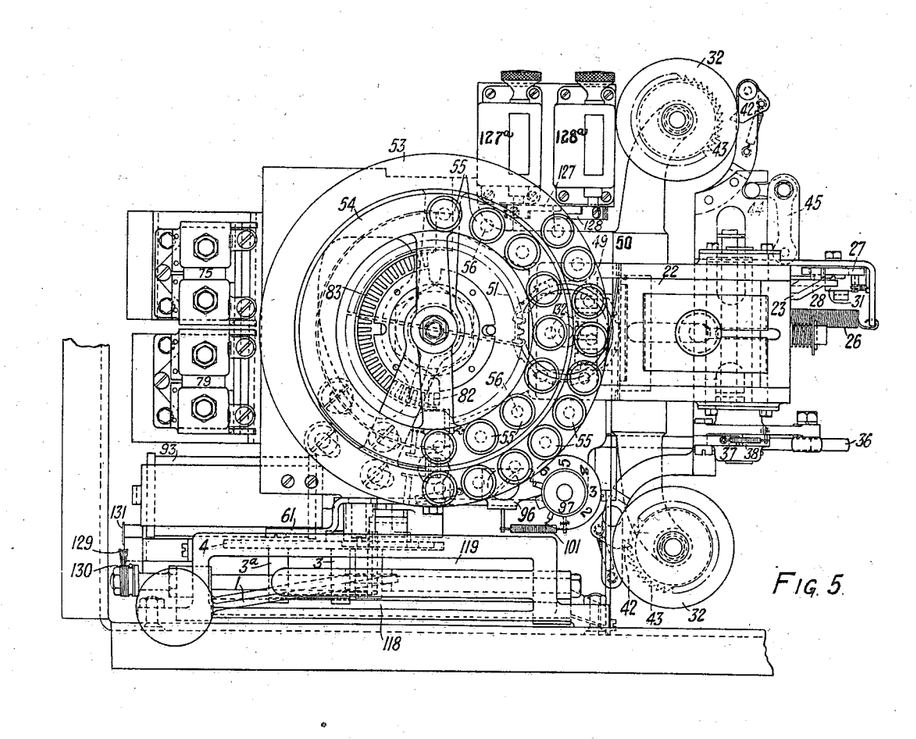
Fig. 5 is a plan view of the machine.

A pair of brushes 129 (Figs. 5 and 6) are moved from contact 130 to contact 131 when a type change takes place, to control the negative circuit from the registers.

Rotatable discs of type 132 are provided to print the race code and these are accessible when the cover plate is removed to zeroize the ticket counters before each race meeting.

I claim:—

1. A ticket printing and issuing machine comprising, in combination, printing mechanism including printing types, means for moving the types selectively into printing position, means for feeding a ticket-forming strip into printing position, ticket-guillotining means, selectable indicating means, a main shaft, an operating lever movable relative to said shaft to select the indicating means, and means, including said shaft, actuated by a forward movement and a return movement of said lever for effecting printing, issuing, and guillotining of a ticket.

2. A ticket printing and issuing machine as claimed in claim 1 including a double gate presenting two guide slots in either of which the lever is operable, depending on the type of ticket to be printed.

JOHN HANDLEY.